United States Patent
Kowalski et al.

[19]

[11] Patent Number: 5,927,021

[45] Date of Patent: *Jul. 27, 1999

[54] DOOR CASSETTE FOR A VEHICLE

[75] Inventors: Daniel J. Kowalski, Lake Orion; Ben Kowalski, Troy, both of Mich.

[73] Assignee: Trim Trends, Inc., Farmington Hills, Mich.

[*] Notice: This patent is subject to a terminal disclaimer.

[21] Appl. No.: 08/729,875

[22] Filed: Oct. 15, 1996

[51] Int. Cl.⁶ .............................. B60J 5/04; B62D 25/04
[52] U.S. Cl. ........................... 49/502; 49/212; 296/146.5
[58] Field of Search ............................ 49/212, 502, 374; 296/146.5; 403/109, 325, 377, 378

[56] References Cited

U.S. PATENT DOCUMENTS

| | | |
|---|---|---|
| 4,405,173 | 9/1983 | Piano . |
| 4,603,894 | 8/1986 | Osenkowski . |
| 4,685,722 | 8/1987 | Srock . |
| 4,712,287 | 12/1987 | Johnston . |
| 4,716,682 | 1/1988 | De Rees . |
| 4,743,062 | 5/1988 | McLaren et al. . |
| 4,785,585 | 11/1988 | Grier et al. . |
| 4,800,638 | 1/1989 | Herringshaw et al. . |
| 4,827,671 | 5/1989 | Herringshaw et al. . |
| 4,831,710 | 5/1989 | Katoh et al. . |
| 4,850,636 | 7/1989 | McLaren et al. . |
| 4,882,842 | 11/1989 | Basson et al. . |
| 4,924,630 | 5/1990 | Lomasney et al. . |
| 4,993,775 | 2/1991 | Keys . |
| 5,001,867 | 3/1991 | Dupuy . |
| 5,067,281 | 11/1991 | Dupuy . |
| 5,095,659 | 3/1992 | Benoit et al. . |
| 5,111,620 | 5/1992 | Lau et al. . |
| 5,121,534 | 6/1992 | Kruzich . |
| 5,174,066 | 12/1992 | Dupuy . |
| 5,226,259 | 7/1993 | Yamagata et al. . |
| 5,308,138 | 5/1994 | Hlavaty . |
| 5,325,632 | 7/1994 | Djavairian et al. . |
| 5,351,443 | 10/1994 | Kimura et al. . |
| 5,355,629 | 10/1994 | Kimura et al. . |
| 5,379,553 | 1/1995 | Kimura et al. . |
| 5,398,453 | 3/1995 | Heim et al. . |
| 5,408,785 | 4/1995 | Heim et al. . |
| 5,417,470 | 5/1995 | Holt . |
| 5,433,041 | 7/1995 | Filippi . |
| 5,469,668 | 11/1995 | Heim et al. . |
| 5,527,083 | 6/1996 | Kreye . |

FOREIGN PATENT DOCUMENTS

| | | |
|---|---|---|
| 491917 | 4/1953 | Canada . |
| 057 270 | 8/1982 | European Pat. Off. . |
| 119 775 A2 | 9/1984 | European Pat. Off. . |
| 128 621 A2 | 12/1984 | European Pat. Off. . |
| 148 987 A2 | 7/1985 | European Pat. Off. . |
| 405 159 A1 | 5/1990 | European Pat. Off. . |
| 384 823 A1 | 9/1990 | European Pat. Off. . |
| 427 153 A2 | 5/1991 | European Pat. Off. . |

(List continued on next page.)

*Primary Examiner*—Daniel P. Stodola
*Assistant Examiner*—Curtis Cohen
*Attorney, Agent, or Firm*—Dykema Gossett PLLC

[57] ABSTRACT

A vehicle door has a door housing and a door cassette that may be assembled off the manufacturing line and tested prior to assembling on the door housing. The door cassette has a cross member onto which a door frame is connected. The cross member and door frame assembly is pivotally connected to the door housing. The door frame has a lower door frame that is inserted into the door housing. A connection adjustably fastens the lower door frame in relation to the housing so that the frame may be easily adjusted to fit to the vehicle body.

43 Claims, 4 Drawing Sheets

FOREIGN PATENT DOCUMENTS

| | | |
|---|---|---|
| 2 236 678 | 2/1975 | France . |
| 2 618 388 | 7/1987 | France . |
| 1 267 116 | 4/1968 | Germany . |
| 1951 710 | 4/1971 | Germany . |
| 27 39 178 | 3/1979 | Germany . |
| 29 52 174 | 6/1981 | Germany . |
| 3217 640 | 11/1983 | Germany . |
| 3402 135 | 7/1985 | Germany . |
| 39 34 590 | 4/1991 | Germany . |
| 43 31 616 | 3/1995 | Germany . |
| 195 19 509 | 12/1995 | Germany . |
| 44 26 426 | 2/1996 | Germany . |
| 195 24 232 | 5/1996 | Germany . |
| 57 198120 | 1/1980 | Japan . |
| 55 8927 | 12/1982 | Japan . |
| 59-34923 | 2/1984 | Japan . |
| 61-169316 | 7/1986 | Japan . |
| 63-60375 | 3/1988 | Japan . |
| 3-96428 | 4/1991 | Japan . |
| 8600543 | 10/1987 | Netherlands . |
| 2 101 535 | 1/1983 | United Kingdom . |
| 2 117 329 | 10/1983 | United Kingdom . |
| 2 149 726 | 6/1985 | United Kingdom . |
| 2 222 847 | 3/1990 | United Kingdom . |
| 2 250 534 | 6/1992 | United Kingdom . |

DOOR CASSETTE FOR A VEHICLE

INCORPORATION BY REFERENCE

This application is related to co-pending application entitled, "Removable Door Cassette For a Vehicle And Method of Assembly", Ser. No. 08/729,092, which is commonly owned, filed Oct. 15, 1996 and incorporated by reference.

BACKGROUND OF THE INVENTION

The present invention relates generally to a door for an automotive vehicle, and, more specifically, to an improved door cassette assembly allowing easy manufacturability and a method therefor.

Traditionally, doors for automotive vehicles are assembled on the assembly line simultaneously with the rest of the vehicle. During the assembly process, components such as the regulator that controls the movement of the window are tested for operability. The manufacturing personnel and time required to perform the installation and testing of the individual components are significant. If a component is not adjusted properly, the improperly adjusted component must be adjusted adding further delay into the assembly process.

On the assembly line, the fit of the door to the vehicle is tested. The vehicle door is typically a singularly stamped unit. An adjustment of the entire door may be made, but adjusting only a portion of the door relative to another portion is either difficult or impossible to make. Commonly, the door frame is manually bent to conform to the desired shape. This process is highly inaccurate and may lead to wind noise and water leaks. Also, achieving the desired adjustment is difficult since a door is not made to be adjusted in the manner in which they are adjusted. Since very small misadjustments may lead to water leaks or wind noise, the conventional method for adjusting a door is highly inconsistent.

Recently, several methods have been described for assembling a portion of the vehicle door off the assembly line that contain, for example, the window regulator and other hardware. The preassembled portion is brought to the assembly line for installation as a preformed unit.

In one modular door construction, the door cassette is removable from the door when desired by the vehicle operator. A frame member extends up from the door to which the cassette attaches. One drawback to the system is that an adjustment of the cassette inward to the vehicle body to prevent wind noise and water leaks is not possible since the cassette connects to the unadjustable frame member having limited adjustability.

Another configuration of a preassembled unit, includes only the window and its movement hardware that is inserted into a rigid door frame. No adjustment in the alignment of the door frame to the vehicle body is possible. Also, no adjustment of the window to the door frame is possible, and may result in water leaks and wind noise.

In yet another configuration a door frame is also preformed. The window track assembly is modularized for installation. The window track pivots relative to the door frame during installation. In such a configuration the window closing efforts may not be tested off line prior to assembly. Another disadvantage is that the door frame is not adjustable to the vehicle body, which may result in wind noise and water leaks.

In still another configuration, a door cartridge is fixed into place by a vertical member extending to the bottom sill of the door. The assembler must reach under the door to secure the cartridge to the door. This is inconvenient for the assembler. Easy adjustability for small adjustments in alignment are not provided.

It would therefore be desirable to provide a vehicle door having the mechanical portion assembled offline as well as provide for a method for convenient assembly and which is readily adjustable.

SUMMARY OF THE INVENTION

Briefly, the present invention provides a cross member onto which a door frame is connected. The cross member and door frame are pivotally connected to a door housing on the vehicle. The door frame has a lower door frame that extends into the door housing. A connection adjustably fastens the lower door frame in relation to the door housing.

In a further embodiment of the invention, the connection has a first adjuster to fasten a door frame into a first position and a second adjuster to adjust the frame about its pivot to secure the frame into a final position.

In one configuration the second adjuster has a screw that moves the cassette closer to or away from the vehicle frame. The screw preferably adjusts the door a small metered amount for each rotation so that the door cassette may be easily and precisely aligned.

An advantage of the invention is that the door frame may be easily adjusted to eliminate water leaks or wind noise.

BRIEF DESCRIPTION OF THE DRAWINGS

Other features and advantages of the present invention will become apparent from the following detailed description which should be read in conjunction with the drawings in which.

DETAILED DESCRIPTION OF THE PREFERRED EMBODIMENT

Referring now to the drawings, like reference numerals are used to identify identical components in the various views. Although the invention will be illustrated in the context of a framed vehicle door, it will be appreciated that this invention may be used in conjunction with other applications requiring an adjustable vehicle door such as a frameless window application.

Figure 1:
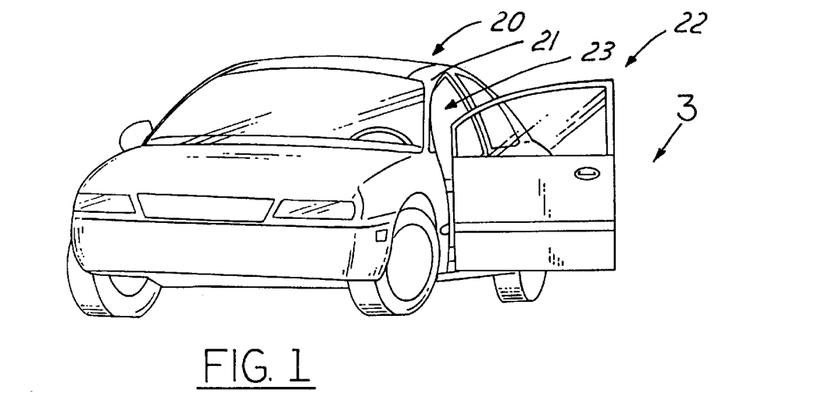
FIG. 1 is a perspective view of an automobile vehicle having a vehicle door according to the present invention.

Referring now to FIG. 1, an automotive vehicle 20 is shown having a vehicle body 21 and an automotive vehicle door assembly 22 for closing an opening 23 in vehicle body 21. The terms, interior, exterior, rearward and forward, as used in this description, are related to door assembly as installed in vehicle body 21. The door assembly 22 described hereinafter is a driver side door. A passenger side door would be essentially the mirror image of the driver side door.

Figure 2:
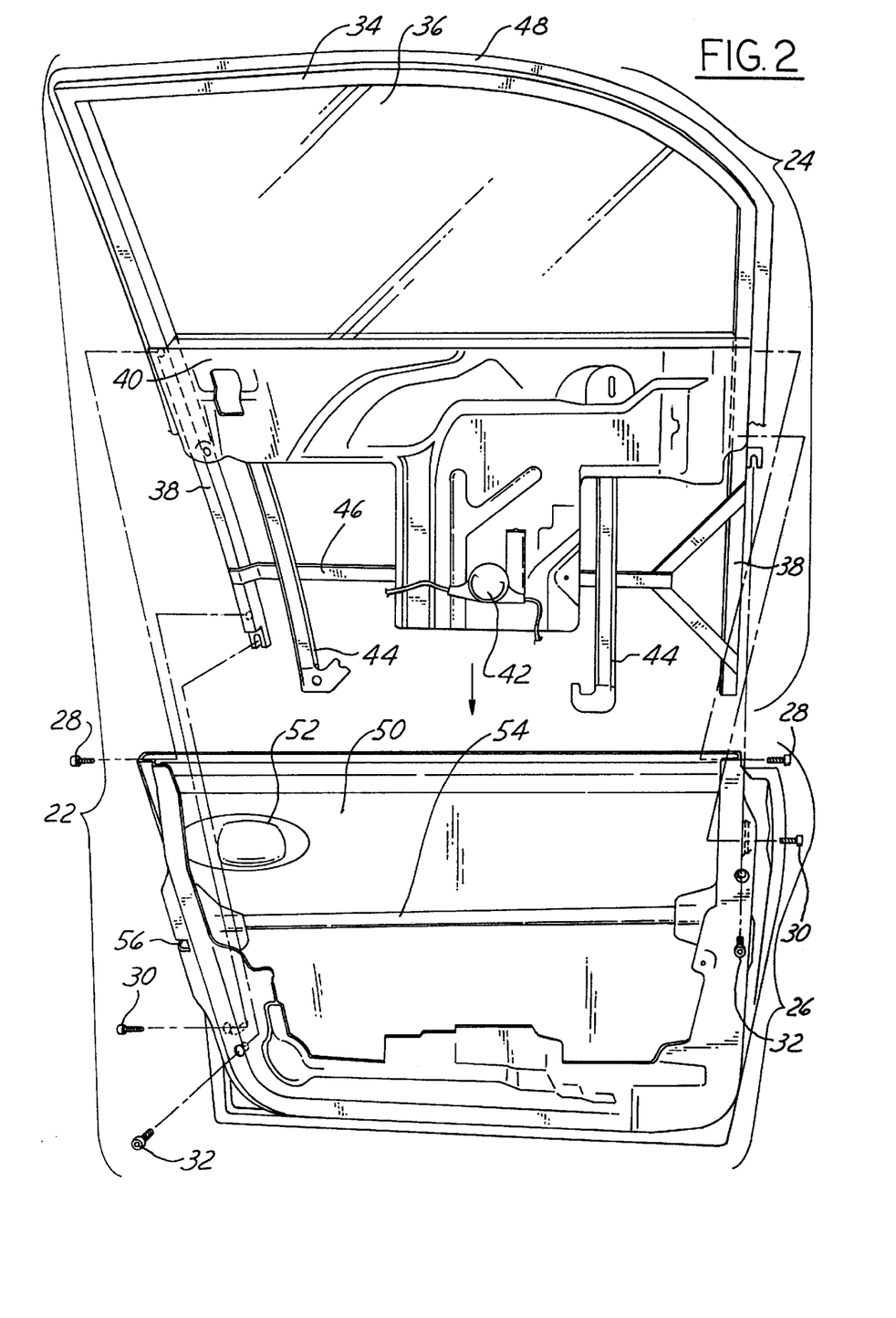
FIG. 2 is an exploded view of an automotive door.

Referring now to FIG. 2, door assembly 22 is shown in an exploded view having door cassette 24 separated from lower door 26. Pivot bolts 28, coarse adjust bolts 30 and fine adjust bolts 32 are used to mount door cassette 24 to lower door 26. Pivot bolts 28 pivotally connect door cassette 24 to lower door 26 when door cassette 24 is housed by lower door 26. Coarse adjust bolts 30 fix door cassette 24 into a predetermined position with respect to the vehicle body. Fine adjust bolts 32 are used to finely adjust door cassette 24 with respect to lower door 26.

Door cassette 24 includes a door frame having an upper door frame 34 and lower door frame 38, a window 36 and its associated hardware, a plate member 40 and a cross member 46. A seal 48 may also be included as part of door cassette 24.

Upper door frame 34 defines an opening to enclose window 36. Upper door frame 34 is preferably roll formed but may also be stamped from steel. Of course, light weight material may be used in door cassette 24 such as plastic or aluminum if structural integrity is maintained. Upper door frame 34 may be eliminated in a frameless window application for applications such as a convertible.

Lower door frame 38 extends into lower door 26 when assembled. Lower door frame 38 may be used as means to secure door cassette 24 to lower door 26. As shown, lower door frame 38 comprises two members, one on the forward most end and rearward most end of door cassette 24. Each member of lower door frame 38 extends from upper door frame 34 near pivot bolt 28. Lower door frame 38 and upper door frame 34 may be separate pieces but are preferably formed as a single continuous piece with upper door frame 34. When formed as a continuous piece the transition between upper door frame 34 and lower door frame 38 is roughly at pivot bolts 28.

Plate member 40 is preferably an individual stamped piece that extends across door cassette 24 and is rigidly connected to the two members of lower door frame 38. Plate member 40 is shaped to provide attachment points for window and door movement hardware such as a window regulator 42 and glass guides 44. Plate member 40 may also provide some structural rigidity to door cassette by acting as a cross support.

Cross member 46 extends across door cassette 24 between the two members of lower door frame 38 and provides rigidity for door cassette 24. Because lower door frame 38 is used to secure door cassette 24, cross member 46 preferably connects to lower door frame 38 near where lower door frame 38 secures to lower door 26. Cross member 46 also provides rigidity to door cassette when shipped since door cassette 24 is built off line and transported before assembly.

Seal 48 extends around upper door frame 34 for sealing upper door frame 34 against the vehicle body. When supplied to the vehicle manufacturer door cassette 24 may contain seal 48 pre-installed on upper door frame 34. Seal 48 may also extend beyond door cassette 24 to provide an endless seal between the vehicle body and lower door 26. If a long seal is provided with door cassette 24, seal 48 may be fastened to lower door 26 after door cassette 24 is installed and adjusted. Seal 48 may also be used to cover connecting hardware such as pivot bolts 28.

Lower door 26 is preferably assembled by the vehicle manufacturer and has the necessary structure to connect to door cassette 24. Lower door 26 is shaped generally to define a cavity to receive door cassette 24. Lower door 26 has an outer door panel 50 contoured to meet the styling for the desired vehicle application. Outer door panel 50 has an opening 52 for receiving a door handle and lock.

Lower door 26 may also have a side impact beam 54 to meet government mandates. Side impact beam 54 extends across lower door 26. Side impact beam 54 is used to provide structural rigidity to lower door 26 in the event of a side impact.

A latch 56 may also be included in lower door 26. Latch 26 is preferably a conventional type latch. Including latch 56 on lower door 26 provides a means to keep the door assembly closed if desired during positioning of door cassette 24.

Figure 3:
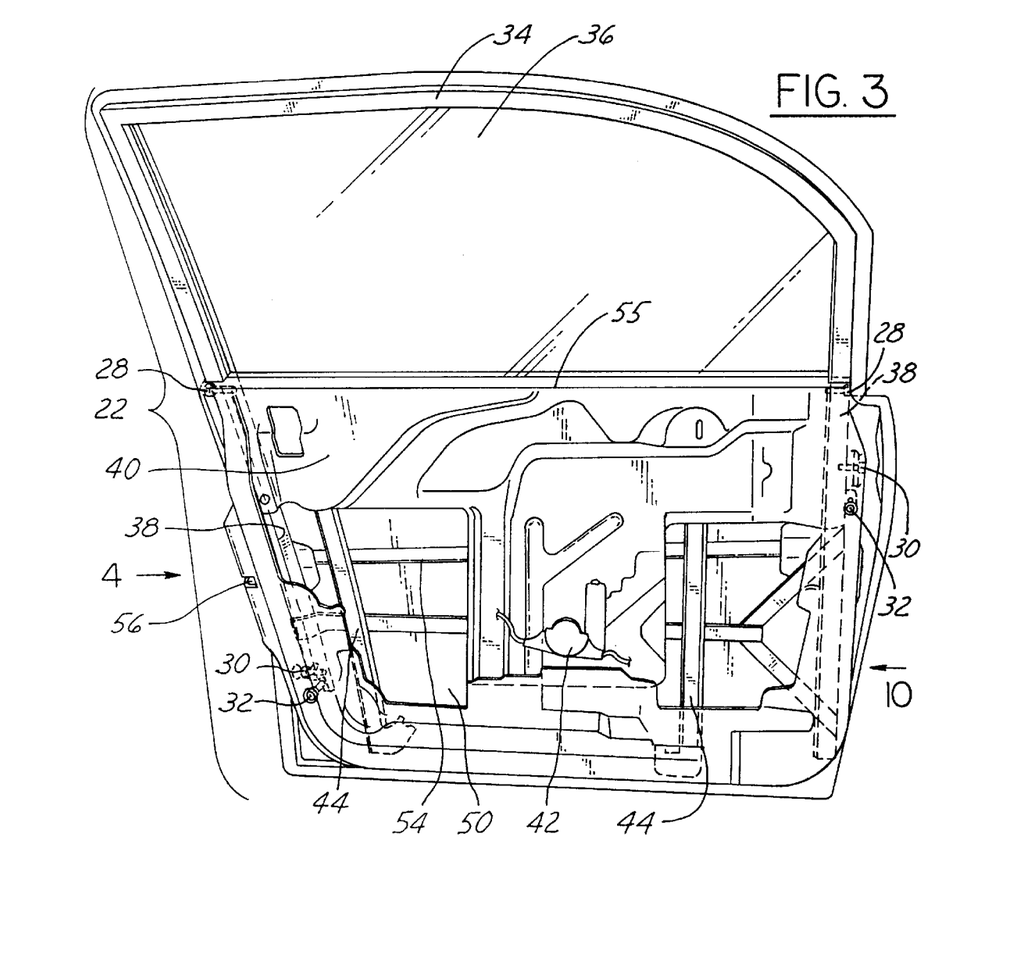
FIG. 3 is an interior view of an automotive door having its interior trim paneled removed.

Referring now to FIG. 3, door cassette 24 is installed within lower door 26. Pivot bolts 28, coarse adjust bolts 28 and fine adjust bolts 32 are used to position door cassette 24 within lower door 26 and with respect to the vehicle body. Pivot bolts 30 define an axis 55 around which door cassette 24 rotates.

Although not shown, a finished trim panel is fastened to lower door 26 to complete assembly. The trim panel contains the buttons and levers to provide a vehicle operator interface to control the functions provided by the door assembly such as moving the window and locking the door.

Figures 4, 5, 6, 7, 8:
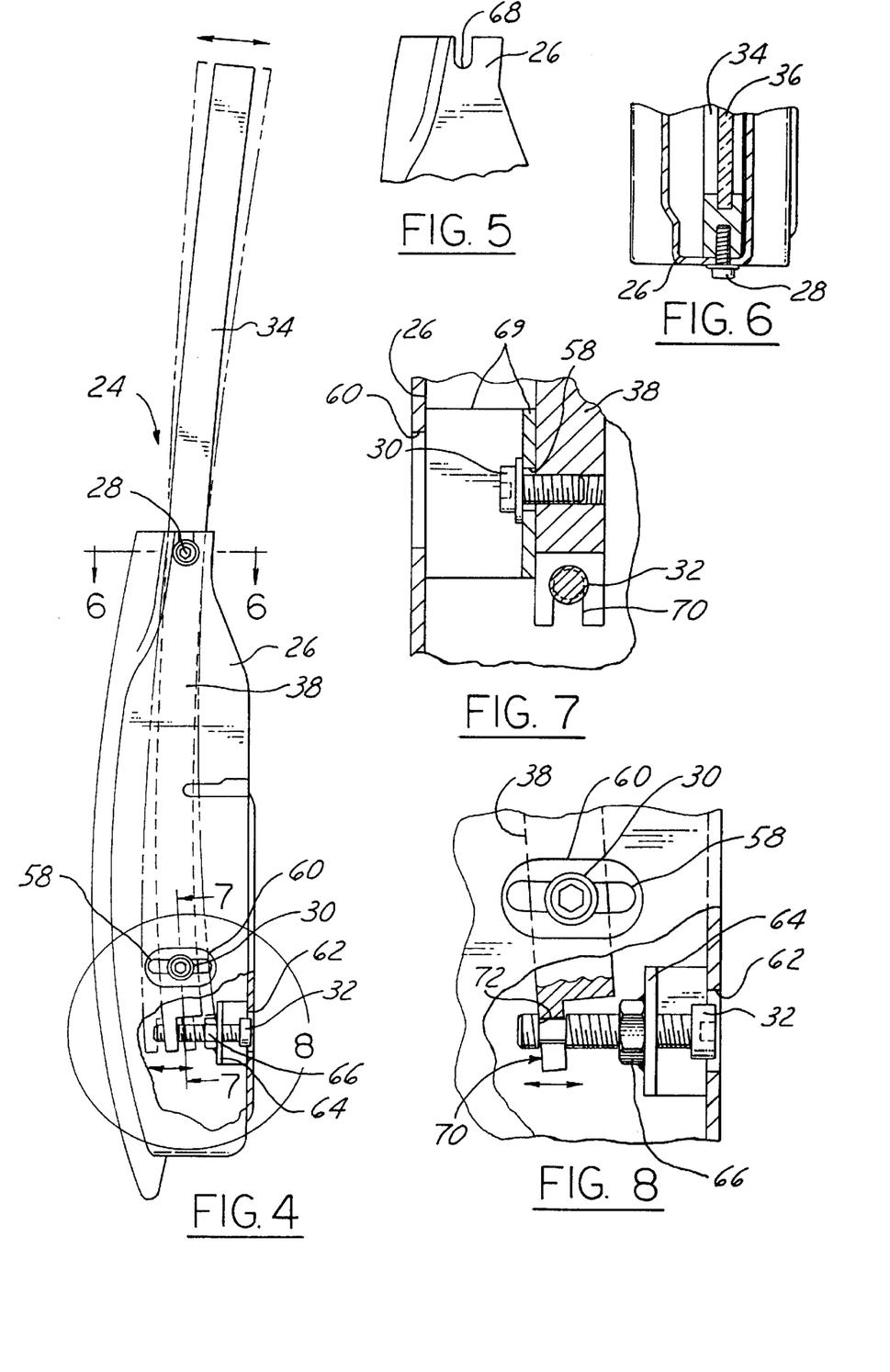
FIG. 4 is a partial cutaway view of an end of automobile door looking forward.
FIG. 5 is a side view of a pivot point of the lower door.
FIG. 6 is a cross-sectional view of a pivot point of the assembled vehicle door.
FIG. 7 is a cross-sectional view vertically and longitudinally through the adjuster of the vehicle door.
FIG. 8 is a cross-sectional view laterally through the vehicle door at the adjuster.

Referring now to FIG. 4, when door cassette 24 is first placed into lower door 26, the initial position secured is governed by coarse adjust bolt 30 and its associated hardware. Coarse adjust bolt 30 is secured to lower door through a slot 58. The pivot movement of door cassette 24 is shown around pivot bolt 28. The maximum distance for movement is governed by slot 58. An opening 60 in lower door 26 allows access to coarse adjust bolt 30. During assembly coarse adjust bolt 30 is lightly tightened to correspond to some nominal position of door cassette 24 relative to the vehicle body.

To set the final position, fine adjust bolt 32 may be used to precisely move door cassette 24 into a final position. Another opening 62 in lower door 26 allows access to fine adjust bolt 32 from the interior side of lower door 26. A bracket 64 is preferably used to hold bolt 32 relative to lower door 26 to provide movement of fine adjust bolt 32 with respect to bracket 64. Bracket 64 may be threaded or a nut 66 may be fixedly attached to bracket 64 so that fine adjust bolt 32 may rotate relative to bracket 64. The end of fine adjust bolt 32 contacts lower door frame 38 so that a fine adjustment may be made in the position of upper door frame 34 with respect to the vehicle body. With the position of fine adjust 32 as shown, as fine adjust bolt is rotated into lower door 26, door cassette 24 is rotated about pivot bolts 28 so that upper door frame 34 is moved closer to vehicle body. Preferably, each rotation of fine adjust bolt 32 corresponds to a known value such as one millimeter of adjustment of upper door frame 34 toward or away from vehicle body. Thus, the desired adjustment may be precisely made.

Referring now to FIG. 5, a portion of lower door 26 is shown with its pivot means. As shown, the pivot means is a U-shaped channel 68 on which the pivot bolts 28 rest. Of course, other means for pivoting would be known to those skilled in the art such as providing merely a hole through which fine adjust bolts could be received or providing a pin on either door cassette 24 or lower door 26 that cooperate to provide a pivoting motion.

Referring now to FIG. 6, a cross sectional view through pivot bolt 28 is shown. As can be seen, pivot bolt 28 extends through lower door 26 and into upper door frame 34.

Referring now to FIG. 7, coarse adjust bolt 30 is shown with respect to lower door frame 38. A bracket 69 mounted to lower door 26 is used to secure coarse adjust bolt 30 to lower door 26. Also, fine adjust bolt 32 is shown with respect to lower door frame 38. Lower door frame 38 has a notch 70 or other means to engage fine adjust bolt 32 so that fine adjust bolt may adjust lower door frame 38. As shown, lower door frame 38 moves into and out of the page while coarse adjust bolt 30 moves within slot 58.

Referring now to FIG. 8, a cross sectional view of fine adjust bolt 32 with respect to notch 70 is shown. One method for finely adjusting the position of lower door frame 38 is to provide a groove 72 in fine adjust bolt 32. As fine adjust bolt 32 rotates with respect to bracket 64 and nut 66, the notch 70 of lower door frame 38 and groove 72 remain engaged. Lower door frame 38 moves as fine adjust bolt 32 and, as a result, notch 70 moves. Lower door frame 38 may be moved so that upper door frame 34 moves closer to or away from the vehicle body to achieve precisely the desired fit.

Figure 9:
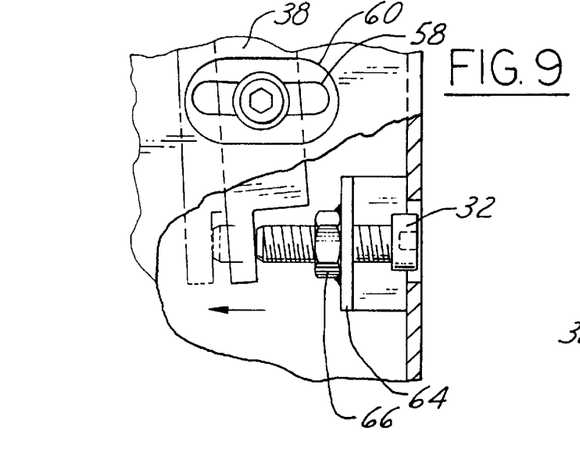
FIG. 9 is a cross-sectional view of an alternative adjuster embodiment.

Referring now to FIG. 9, an alternative method for finely adjusting lower door frame 38 is shown. In this embodiment only the end of fine adjust bolt 32 presses against a portion of frame 38 to move lower door frame 38 about the pivot point. Door cassette 24 may be weighted so that fine adjust bolt 32 forces movement in one direction to counteract the weight of door cassette 24. Since if travel in the other direction is required, for example backing the bolt away, door cassette 24 will naturally move in that direction due to its weight.

Figure 10:
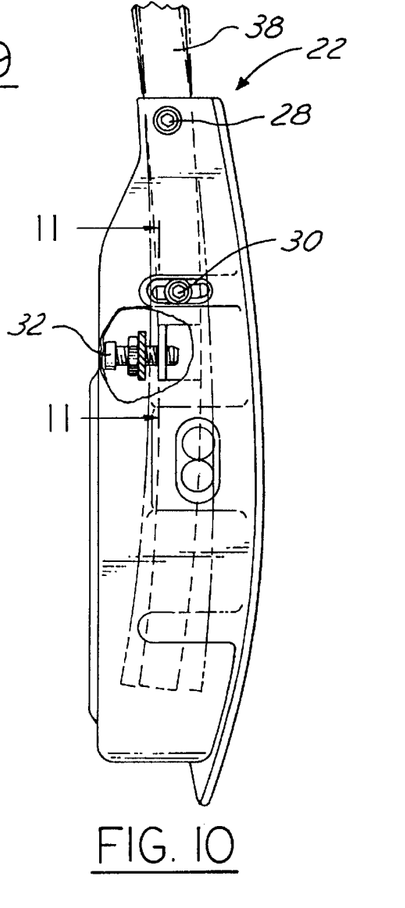
FIG. 10 is a partial cutaway end view of an automotive door from the front of the vehicle.

Referring now to FIG. 10, a side cutaway view is shown of the forward most end of door assembly 22. It is preferred that both the front and rear portions of door assembly 22 have similar adjustment means. Front end of door has a pivot bolt 28, coarse adjust 30 and a fine adjust bolt 32 that operate in the same manner as that of the rearward most end of the door. Their vertical positions, however, may be slightly altered. The position of the adjustment means may be moved due to the design requirements of the vehicle including location of latches, hinges and passthroughs for wires to connect the electrical components within the door to the rest of the vehicle.

Figure 11:
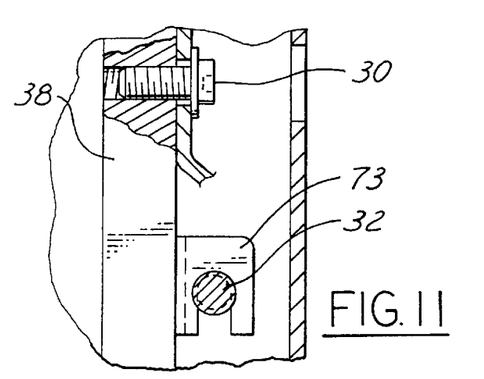
FIG. 11 is a partial cutaway view of an adjuster on the front of vehicle door looking rearward.

Referring now to FIG. 11, a side cross sectional view through coarse adjust bolt 30 and fine adjust bolt 32 is shown. Instead of connecting to a notch in the end of lower door frame 38 as in the rearward most connection, a bracket 73 may be connected to lower door frame 38 to provide the same function.

In operation, lower door 26 may be manufactured and installed on the vehicle so that lower door may be painted along with the rest of the vehicle or painted prior to installation. The lower door is preferably made by the vehicle manufacturer.

The door cassette structure is assembled off the assembly line and tested. To assemble the door cassette, upper door frame 34, lower door frame 38, plate member 40 and cross member 46 are preferably welded together to form the door cassette structure. This assembly is preferably dipped in a common rust preventative such as "E-coat" before further assembly. Also, this structure may be painted a finish color depending on the vehicle application.

Glass guides 44 are installed on the cassette structure and the window 36 is inserted. Window regulator 42 is then connected to the window and mounted to the structure. Any other mechanism may then be installed onto the door structure. Any seals may also, be preinstalled. The operation of the mechanisms are then tested for operability. This assembly is then moved to the assembly line for installation to complete a door assembly 22.

During the assembly process door cassette 24 is placed into lower door 26. Pivot bolts 28 are inserted so that door cassette pivots in lower door 26. Coarse adjust bolts 30 are tightened lightly to hold door assembly 22 into a position that has been predetermined to provide roughly the proper fit for the vehicle. The fine adjust bolts 32 may then be inserted and placed into a nominal position. The door of the vehicle may then be closed and any adjustment made from within the vehicle by fine adjust bolts 32. Fine adjust bolts 32 pivot upper door frame 34 about pivot bolts 28. Once fine adjust bolts 32 are adjusted, coarse adjust bolts 30 may be fully tightened.

Figure 12:
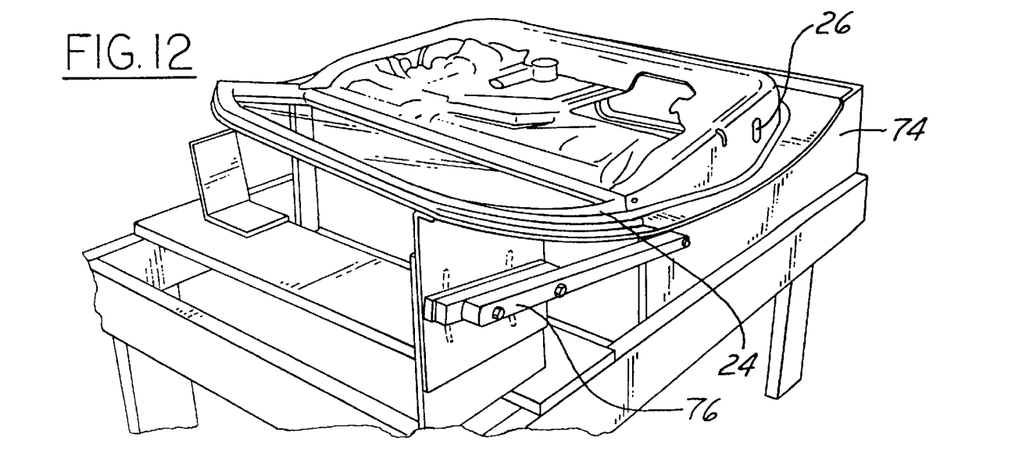
FIG. 12 is a perspective view of an automotive vehicle door on an adjustment fixture.

Referring now to FIG. 12, a fixture 74 may also be used in the assembly process as an alternative to installing the door in a vertical fashion. Lower door 26 may be connected to door cassette 24 in a horizontal fashion, then installed onto the vehicle. Fixture 74 preferably has an adjustment 76 to allow the door cassette 24 to be set at a predetermined angle with respect to lower door 26. If the vehicle body being manufactured has a known tolerance variability, adjustment 76 may be set to match that tolerance. If any further adjustments are required, fine adjust bolts 32 may be adjusted once door assembly 22 has been placed upon the vehicle.

While the best mode for carrying out the present invention has been described in detail, those familiar with the art to which this invention relates will recognize various alternative designs and embodiments for practicing the invention as defined by the following claims. For example in a frameless window application the upper door frame and seal may be eliminated. the seal may placed on the vehicle body.

What is claimed is:

1. In an automotive vehicle, the combination of a door housing having a cassette opening and a door cassette for mounting in said cassette opening, said door cassette comprising:

a cross member:

a door frame affixed to said cross member, said door frame having a lower door frame, said lower door frame received within the cassette opening of said door housing;

pivot means for pivotally joining said door frame to said door housing;

attachment means for adjustable securing said lower door frame in relation to said door housing to a first position and then adjusting said door frame to a final position in said door housing;

said attachment means comprising a first means for providing fine adjustment of said lower door frame into said first position and a second means for adjusting said lower door frame to said final position.

2. In an automotive vehicle, the combination as recited in claim 1, wherein said door frame further comprises an upper door frame connected to said lower door frame, said upper door frame extending from said door housing and defining a window opening.

3. In an automotive vehicle, the combination as recited in claim 2, further comprising a seal connected to said upper door frame.

4. In an automotive vehicle, the combination as recited in claim 2, wherein said upper door frame is continuous with said lower door frame.

5. In an automotive vehicle the combination as recited in claim 1, wherein said first means comprises a first bracket affixed to said door housing, said bracket having a slot, and a fastener received through said slot connecting said bracket to said lower door frame.

6. In an automotive vehicle, the combination as recited in claim 1, wherein said second means comprises a second bracket, said second bracket receiving a threaded fastener, said threaded fastener engaging said lower door frame and moving relative to said second bracket when rotated so that said lower door frame moves as said threaded fastener rotates.

7. In an automotive vehicle, the combination as recited in claim 1, wherein said pivot means comprises a channel in said door housing, a bolt and a hole in said door frame, said bolt connecting said door housing to said door frame through said channel.

8. The combination of a door cassette and a door housing of an automotive vehicle said door cassette comprising:
   a cross member;
   a door frame affixed to said cross member and pivotally connected to the door housing, said door frame having a lower door frame, said lower door frame extending within the door housing;
   pivot means having an axis and pivotably connecting said lower door frame to said door housing;
   a first connection means for angularly moving said lower door frame about said axis in relation to said door housing in a first position; and
   a second connection means for angularly moving said lower door frame to a second position about said axis in relation to said door housing.

9. The combination of a door cassette and a door housing as recited in claim 8, wherein said door frame further comprises an upper door frame connected to said lower door frame, said upper door frame extending from the door housing and defining a window opening.

10. The combination of a door cassette and a door housing as recited in claim 9, further comprising a seal connected to said upper door frame.

11. The combination of a door cassette and a door housing as recited in claim 9, wherein said upper door frame is continuous with said lower door frame.

12. The combination of a door cassette and a door housing as recited in claim 8, wherein said first connection comprises a coarse adjustment for adjusting said lower door frame into first position.

13. The combination of a door cassette and a door housing as recited in claim 8, wherein said first means comprises a first bracket affixed to aid door housing, said bracket having a slot, and a fastener received through said slot connecting said bracket to said lower door frame.

14. The combination of a door cassette and a door housing as recited in claim 8, wherein the door housing has an opening on an interior side thereof, said second connection being accessible through said opening.

15. The combination of a door cassette and a door housing as recited in claim 8, wherein said second connection comprises a second bracket and a threaded fastener, said second bracket receiving said threaded fastener, said threaded fastener engaging said lower door frame and moving relative to said bracket when rotated so that said lower door frame moves as said threaded fastener rotates.

16. The combination of a door cassette and a door housing as recited in claim 8, further comprising a plate member connected to said door frame.

17. The combination of a door cassette and a as recited in claim 10, further comprising a window connected to said plate member.

18. The combination of a door cassette and a door housing as recited in claim 17, further comprising a window adjustment means connected to said plate member for adjusting said window.

19. The combination of a door cassette and a door recited in claim 18, wherein said adjustment means comprises glass guides and a window regulator.

20. An automobile comprising:
   a vehicle body having one or more body openings;
   a door housing in at least one of said body openings, each door housing having an end;
   a door cassette coupled to said door housing, each door cassette having a cross member;
   a door frame affixed to said cross member, said door frame pivotally connected to said door housing, said door frame having a lower door frame, said lower door frame extending into said door housing;
   a first connection which adjustably fastens said lower door frame in relation to said door housing through said end of said door housing:
   a second connection which adjustable fastens said lower door frame in relation to said door housing: and
   said second connection comprising a fine adjustment for adjusting said lower door frame to a final position.

21. An automobile as recited in claim 20, wherein said door frame further comprises an upper door frame connected to said lower door frame, said upper door frame extending from said door housing and defining a window opening.

22. An automobile as recited in claim 21, further comprising a seal connected to said upper frame.

23. An automobile as recited in claim 21, wherein said upper door frame is continuous with said lower frame.

24. An automobile as recited in claim 20, wherein first connection comprises a coarse adjustment for adjusting said lower door frame into a first position.

25. An automobile as recited in claim 24, wherein said coarse adjustment comprises a first bracket affixed to said door housing, said bracket having a slot, and a fastener received through said slot for connecting said bracket to said lower door frame.

26. An automobile as recited in claim 20, wherein said second connection is accessible through a side of said door housing.

27. An automobile as recited in claim 20, wherein said fine adjustment comprises a second bracket, said second bracket receiving a threaded fastener, said threaded fastener engaging said lower door frame and moving relative to said bracket when rotated so that said lower door frame moves as said threaded fastener rotates.

28. An automobile as recited in claim 20, further comprising a plate member connected to said door frame.

29. An automobile as recited in claim 20, further comprising a window connected to said plate member.

30. An automobile as recited in claim 29, further comprising a window adjustment means connected to said window for adjusting said window.

31. An automobile as recited in claim 30, wherein said adjustment means comprises glass guides and a window regulator.

32. The combination of a door cassette and a door housing having a cassette opening, interior and exterior sides and a pair of ends, comprising:

said door cassette having a cross member and a door frame affixed to said cross member;

said door frame having a lower door frame which slidably extends into the cassette opening of said door housing;

pivot means carried by the ends of said door housing for pivotably connecting said door frame to said door housing about a pivot axis;

a first connection means carried by one of said ends of said door housing for angularly moving the position of said lower door frame about said pivot axis within and relative to said door housing; and a second connection means carried by said door housing for angularly moving said door frame about said pivot axis within said door housing.

33. The combination of a door cassette and a door housing as recited in claim 32, wherein said first connection is spaced from said pivot axis for providing a course adjustment of said lower door frame within said door housing into a first position.

34. The combination of a door cassette and a door housing as recited in claim 33, wherein said first connection comprises a first bracket affixed to said door housing, said bracket having a slot, and a threaded fastener extending through said slot for connecting said bracket to said lower door frame.

35. The combination of a door cassette and a door housing as recited in claim 33, wherein there are a pair of first connections, each of said connections being carried by one or the other of said ends.

36. The combination of a door cassette and a door housing as recited in claim 35, where each of said first connections comprises a first bracket affixed to said door housing, said bracket having a slot, and a threaded fastener extending through said slot for connecting said bracket to said lower door frame.

37. The combination of a door cassette and a door housing as recited in claim 32, said door housing having an opening in said interior side, said second connection being accessible through said opening in said interior side.

38. The combination of a door cassette and a door housing as recited in claim 37, wherein said second connection is spaced from said pivot axis for providing a fine adjustment of said lower door frame within said door housing to a final position.

39. The combination of a door cassette and a door housing as recited in claim 38, wherein said second connection comprises a second bracket, said second bracket receiving a threaded fastener, said threaded fastener engaging said lower door frame and moving relative to said bracket when rotated so that said lower door frame moves within said housing as said last mentioned threaded fastener rotates.

40. The combination of a door cassette and a door housing as recited in claim 37, wherein there are a pair of second connections, each of said second connections being accessible through said interior side of said door housing.

41. The combination of a door cassette and a door housing as recited in claim 40, wherein each of said second connections comprises a second bracket, said second bracket receiving a threaded fastener, said threaded fastener engaging said lower door frame and moving relative to said bracket when rotated so that said lower door frame moves within said housing as said last mentioned threaded fastener rotates.

42. The combination of a door cassette and a door housing as recited in claim 32, wherein said door frame comprises an upper door frame connected to and continuous with said lower door frame, said upper door frame extending from said door housing and defining a window opening, and a seal connected to said upper door frame.

43. The combination of a door cassette and a door housing as recited in claim 32, wherein said door cassette comprises a plate member connected to said door frame, a window connected to said plate member; window adjustment means connected to said window for adjusting same; said adjustment means comprising glass guider and a window regulator.

* * * * *

UNITED STATES PATENT AND TRADEMARK OFFICE
CERTIFICATE OF CORRECTION

PATENT NO.  : 5,927,021
DATED       : July 27, 1999
INVENTOR(S) : Daniel J. Kowalski
              Ben Kowalski It is certified that error appears in the above-indentified patent and that said Letters Patent is hereby corrected as shown below:

Claim 1, Column 6, line 60, delete "fine" and insert -- coarse --;

Claim 1, Column 6, line 61, delete "adjusting" and insert -- providing fine adjustment of --;

Claim 13, Column 7, line 57, delete "aid" and insert -- said --;

Claim 17, Column 8, line 7, after "and a" insert -- door housing --;

Claim 17, Column 8, line 8, delete "10" and insert -- 16 --;

Claim 19, Column 8, line 14, after "door" insert -- housing as --

Claim 20, Column 8, line 30, delete "adjustable" and insert -- adjustably --;

Signed and Sealed this

Fourteenth Day of March, 2000

Attest:

Attesting Officer

Q. TODD DICKINSON

Commissioner of Patents and Trademarks